(No Model.)
J. R. RECTOR.
COTTON CHOPPER.
No. 351,526. Patented Oct. 26, 1886.
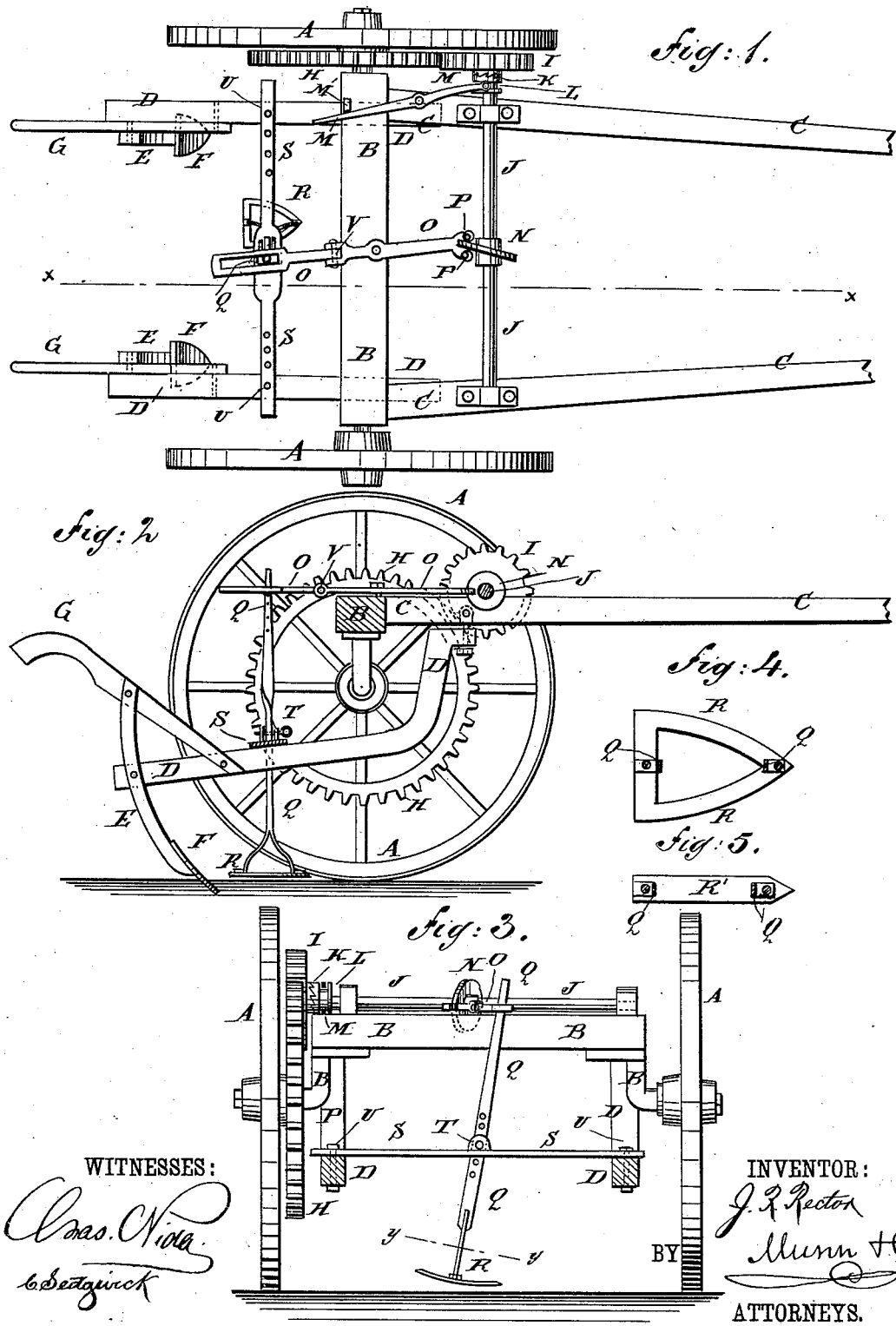
WITNESSES:
INVENTOR: J. R. Rector
BY Munn & Co.
ATTORNEYS.

UNITED STATES PATENT OFFICE.

JOHN R. RECTOR, OF SALADO, TEXAS.

COTTON-CHOPPER.

SPECIFICATION forming part of Letters Patent No. 351,526, dated October 26, 1886.

Application filed June 8, 1886. Serial No. 204,462. (No model.)

*To all whom it may concern:*

Be it known that I, JOHN R. RECTOR, of Salado, in the county of Bell and State of Texas, have invented a new and useful Improvement in Cotton-Choppers, of which the following is a full, clear, and exact description.

Reference is to be had to the accompanying drawings, forming a part of this specification, in which similar letters of reference indicate corresponding parts in all the figures.

Figure 1 is a plan view of my improved cotton-chopper shown as applied to a cultivator. Fig. 2 is a sectional side elevation of the same, taken through the line $x\ x$, Fig. 1. Fig. 3 is a rear elevation of the same, the plow-beams being shown in section. Fig. 4 is a plan view of the chopping-hoe, the lever-handle being shown in section through the line $y\ y$, Fig. 3. Fig. 5 is a plan view of another form of chopping-hoe, the lever-handle being shown in section.

The object of this invention is to provide cotton-choppers constructed in such a manner that they can be readily applied to any ordinary cultivator, and which shall be simple in construction, convenient in use, and reliable in operation.

The invention consists in the construction and combination of various parts of the cotton-chopper, as will be hereinafter fully described and then claimed.

A represents the wheels, B the axles, C the shafts, D the plow-beams, E the plow-standards, F the plows, and G the plow-handles, of an ordinary cultivator.

To one of the wheels, A, is attached a large gear-wheel, H, the teeth of which mesh into the teeth of the smaller gear-wheel, I, placed loose upon the end of the shaft J. Upon the inner end of the hub of the gear-wheel I are formed clutch-teeth, with which engage the teeth of the clutch K, placed and sliding upon the shaft J, and connected therewith by a tongue and groove or other suitable means, so that the said clutch will carry the said shaft with it in its revolution. Around the clutch K is formed an annular groove, L, to receive the forked end of the lever M, which is pivoted to a shaft, C, and the rear end of which extends back into such a position that it can be readily reached and operated by the plowman to throw the clutch K into and out of gear with the gear-wheel I.

To the axle B is attached a catch, M', in such a position that when the lever M is on the inner side of the said catch it will hold the clutch K in gear with the gear-wheel I, and when the said lever is on the outer side of the said catch it will hold the said clutch out of gear with the said gear-wheel.

The shaft J revolves in bearings attached to the shafts C, and to it, midway between the said shafts, is attached the disk-wheel N, which is made with its plane at an angle with its axis, forming a cam-wheel. The cam-wheel N enters a slot in the forward end of the lever O, which is pivoted to the axle B, so that the said lever will be vibrated by the revolution of the said cam-wheel. The friction between the cam-wheel N and the forked end of the lever O is lessened by two small rollers, P, pivoted to the prongs of the said lever and resting against the opposite sides of the said wheel. The rear end of the lever O is slotted to receive the upper end of the lever-handle Q, to the lower end of which is attached the chopping-hoe R. The lever-handle Q passes through a slot in the center of the cross-bar S, and is pivoted by a bolt or pin, T, to the said cross-bar, or to lugs formed upon it. Several holes are formed in the middle part of the lever-handle Q, to receive the fulcrum pin or bolt T, so that the said lever-handle can be readily adjusted to raise or lower the chopping-hoe R, as circumstances may require.

The end parts of the cross-bars S are loosely connected with the plow-beams D by bolts U, so that the said cross-bar will not interfere with the lateral movement of the plow-beams as the plows are guided along a row of plants, and so that the chopping-hoe can be guided along the row of plants by guiding the plows. Several holes are formed in the end parts of the cross-bar S to receive the connecting-bolts U, so that the plow-beams can be readily adjusted at any desired distance apart.

The chopping-hoe R is made in the form of an isoceles triangle with its equal sides slightly curved, and has its middle part cut away, as shown in Figs. 1 and 4, so that the dirt and the chopped-out plants will fall through the open middle part of the chopping-hoe and will not be carried forward by the said hoe and thrown upon the plants left for a stand. The chopping-hoe R is curved laterally to correspond with the sweep of the lower end of the lever-handle O, so that the said hoe will pass through the soil easily. The chopping-hoe R is arranged with its acute angle forward, and the lower end of the lever-handle Q is forked, the end of one prong being attached to the acute angle of the hoe, and the end of the other prong being attached to the center of the rear end of the said hoe.

The lever O has a hinge-joint, V, formed in it between its pivot and rear end, so that the plows and the chopping-hoe can be readily raised from the ground for convenience in passing obstructions, turning around, and passing from place to place, the said joint V being so formed, as shown in Fig. 2, as to have a free vertical movement, but no lateral movement.

A chopping-hoe constructed as herein shown and described will not be liable to catch upon stumps or other obstructions, and will not be liable to bruise or otherwise injure the plants left for a stand.

The slot in the rear part of the vibrating lever O is made long, as shown in Fig. 1, so that the upper end of the lever handle Q can be drawn to the rearward to throw the chopping-hoe R forward with a sudden movement, to avoid destroying plants that the plowman may desire to save.

The chopping-hoe can be made long and narrow, as shown at R' in Fig. 5. The chopping hoe is secured to the lever-handle by bolts, as indicated in Figs. 4 and 5, so that they can be readily detached and replaced by longer or shorter hoes, as circumstances may require.

Having thus described my invention, what I claim as new, and desire to secure by Letters Patent, is—

1. The combination, with the wheels, axle, shafts, and plow-beams of a cultivator, of the gear-wheels H I, the shaft J, connected with the drive-wheel by the said gear-wheels, the cam-wheel N, attached to the said shaft, the lever O, connected with the said cam-wheel, the lever-handle Q, connected with the said lever and carrying the chopping-hoe, and the cross-bar S, carrying the said lever-handle and connected with the plow-beams, substantially as herein shown and described, whereby the said chopping-hoe will be vibrated by the advance of the machine and can be guided by guiding the plows, as set forth.

2. The combination, with a wheel-cultivator, of a bar adjusably pivoted to the plow-beams, a lever-handle adjustably pivoted to said bar and carrying a chopping-hoe, a shaft journaled on the thills, a cam on the said shaft, a jointed lever pivoted to the axle and engaging the cam and lever handle, and means for operating the said cam-shaft by the forward movement of the cultivator, substantially as herein shown and described.

3. The combination, with the wheels, axle, shafts, and plow-beams of a cultivator, of the bar S, pivoted to the plow-beams, the lever-handle Q, pivoted to the bar, the hoe R on the lower end of the lever-handle, the shaft J, the cam N on said shaft, the jointed lever O, having its forward end forked and its rear end slotted, the gear-wheels H I, the clutch K, the lever M, and the catch M', substantially as herein shown and described.

JOHN R. RECTOR.

Witnesses:
 A. A. LOWERY,
 W. T. ROBERTSON.